United States Patent
Smith et al.

[11] Patent Number: 5,985,946
[45] Date of Patent: *Nov. 16, 1999

[54] FOAMED ARTICLES

[75] Inventors: Peter John Smith, Northwich; Bernard John Cross, Middlesbrough, both of United Kingdom

[73] Assignee: Imperial Chemical Industries PLC, London, United Kingdom

[*] Notice: This patent is subject to a terminal disclaimer.

[21] Appl. No.: 09/011,858

[22] PCT Filed: Nov. 5, 1996

[86] PCT No.: PCT/GB96/02705

§ 371 Date: Feb. 5, 1998

§ 102(e) Date: Feb. 5, 1998

[87] PCT Pub. No.: WO97/17395

PCT Pub. Date: May 15, 1997

[30] Foreign Application Priority Data

Nov. 9, 1995 [EP] European Pat. Off. .............. 95117645
Jul. 31, 1996 [GB] United Kingdom .................. 9616033

[51] Int. Cl.⁶ ................................... C08J 9/02; C08J 9/34
[52] U.S. Cl. ................................. 521/97; 521/51; 521/79; 521/81; 521/139
[58] Field of Search .................................. 521/97, 51, 79, 521/81, 139

[56] References Cited

U.S. PATENT DOCUMENTS 4,196,267  4/1980  Watanabee et al. .

FOREIGN PATENT DOCUMENTS 0 411 923   2/1991   European Pat. Off. .
1 210 672  10/1970   United Kingdom .
1 583 402   1/1981   United Kingdom .
96 00256    1/1996   WIPO .

OTHER PUBLICATIONS

Database WPI, Week 9208, Derwent Publications Ltd., London, GB; AN 92:061823 'Foamed polystyrene with uniform, fine cell structure.' & JP,a,4 008 738 (Chisso Corp.) Jan. 13, 1992, see abstract.

*Primary Examiner*—Morton Foelak

[57] ABSTRACT

A foamed article having a closed cell structure formed from: (i) a polymer blend comprising at least 80% by weight of a styrenic polymer and up to 20% by weight of an acrylic polymer; and (ii) gaseous carbon dioxide blowing agent.

9 Claims, No Drawings

FOAMED ARTICLES

The present invention relates to foamed articles formed from a blend of a styrenic polymer and at least one acrylic polymer.

It is well known that polystyrene may be readily foamed by a variety of processes, including extrusion.

GB 2146941 discloses the preparation of a polystyrene foam by an extrusion process.

EP 0411923 is directed towards the preparation of polystyrene foam having a density from 32 to 160 kg·m$^{-3}$ using an extrusion process in which liquid carbon dioxide is employed as a blowing agent.

U.S. Pat. No. 4,552,904 discloses the preparation of a polystyrene foam by the re-expansion of an extruded foam. The thermal conductivity of the materials produced according to the invention of U.S. Pat. No. 4,552,904 are shown to have thermal conductivities of 0.032 Kcal·(m·hr·°C.)$^{-1}$, i.e. 37.2 mW·(mK)$^{-1}$ or above. Furthermore, commercial products are shown to have thermal conductivities of 0.029 Kcal·(m·hr·°C.)$^{-1}$, i.e. 33.7 mW·(mK)$^{-1}$ or above.

For a foam to be considered a "good" insulating material it should have as low a thermal conductivity as possible and the value of the thermal conductivity should remain stable with time.

The thermal conductivity of a foam is largely associated with the bubble structure within the foam, the density of the foam and the material which fills the bubbles within the foam. In foams that have been blown by gaseous blowing agents, typically carbon dioxide, CFCs and HCFCs, the gaseous blowing agent tends to leach out of the foam to be replaced by air. The thermal conductivity of a foam which contains air is much inferior to that of one within which is retained the gaseous blowing agent.

The present invention provides foams which have lower initial thermal conductivities and retain gaseous carbon dioxide blowing agent over longer periods thereby maintaining beneficial thermal properties. Additional benefits may also include the reduced emission of gaseous blowing agents to the environment and the ability to prepare foams without the need for the inclusion of fire retardants or plasticisers within the foam.

Accordingly, in a first aspect the present invention provides a foamed article having a closed cell structure formed from (i) a polymer blend comprising at least 80% by weight of a styrenic polymer and up to 20% by weight of an acrylic polymer; and (ii) gaseous carbon dioxide blowing agent.

The styrenic polymer may be a homopolymer or a copolymer of at least one of styrene, methyl styrene and acrylonitrile. Preferably at least 50% of the monomer units of the styrenic polymer are derived from styrene and in particular the styrenic polymer is a homopolymer of styrene. Suitably, the styrenic polymer has an average molecular weight (number average) from 180000 to 250000, and preferably from 180000 to 230000, for example about 200000. Adventitiously, the present invention can also be used with styrenic polymers which are obtained at least in part from recycled or scrap materials.

The acrylic polymer may be a homopolymer or a copolymer of at least one $C_{1-8}$ alkyl ($C_{1-4}$ alkyl)acrylate, for example methyl methacrylate, methyl acrylate, ethyl acrylate, propyl acrylate and butyl acrylate. Preferably the acrylic polymer is a copolymer, particularly a copolymer containing a methacrylate, e.g. methyl methacrylate, and an acrylate, such as methyl acrylate or ethyl acrylate. The acrylic polymer preferably contains from 50 to 100%, particularly from 80 to 95, and especially 90 to 95 by weight of monomer units which are derived from a methacrylate, e.g. methyl methacrylate, with the balance of the monomer units being derived from at least one acrylate. Preferably, the acrylic polymer has an average molecular weight (number average) which is less than 90%, preferably less than 80%, particularly less than 75% and especially from 50 to 60%, that of the styrenic polymer. Suitably, the acrylic polymer has an average molecular weight from 50000 to 180000, preferably from 50000 to 150000 and particularly from 80000 to 140000. Further preferred is that the acrylic polymer contains less than 5%, in particular less than 2% of residual monomer (based on the weight of the acrylic polymer).

The addition of the acrylic polymer may cause a reduction in density of the foamed article below that of an article formed from the styrenic polymer alone. However, there may be circumstances where such a reduction in density is not desired and in which case foamed articles of the same density as those formed from styrenic polymer alone may be prepared by controlling the amount of blowing agent and the conditions under which the foamed articles are produced.

The foamed article has a closed cell structure. Typically, the closed cells have sides from 100 to 1000 $\mu$, particularly from 100 to 900 $\mu$ and especially from 100 to 600 $\mu$.

Generally, increasing the proportion of the acrylic polymer within the polymer blend decreases the conductivity of the foamed article. Typically, a foamed article formed from a polymer blend containing about 10% by weight of an acrylic polymer will show a reduction in thermal conductivity of about 2 mW·(mK)$^{-1}$ compared with a similar article formed from a styrenic polymer alone. The thermal conductivity of the foamed article is typically from 80 to 97%, preferably from 85 to 97 and particularly from 85 to 90% of a similarly foamed article formed from the styrenic polymer alone. This reduction in thermal conductivity is retained even after several months during which time conventional styrenic foams would show an increase in thermal conductivity due to the diffusion of air into and blowing agent out of the foam.

Additionally, the internal gas pressure after the formation of the foam is less in the foam of the present invention as compared with a similarly foamed article formed from the styrenic polymer alone. Typically, the internal gas pressure is from 25 to 75%, preferably from 30 to 70 and particularly from 50 to 70% of the internal gas pressure of a similarly foamed article formed from the styrenic polymer alone. The internal gas pressure is typically within the range 0.15 to 0.4, preferably 0.25 to 0.35 bar.

In use the foamed article may be laminated onto any suitable support material, e.g. plasterboard, wood or an other plastics structure, in order to form an insulated building material and the like.

The foamed article may be formed on conventional extrusion equipment.

The use of carbon dioxide as the blowing agent in conjunction with the use of an acrylic polymer as a constituent of the polymer blend confers a number of benefits both to the process through by the foam is prepared and also the thermal properties of the foam. Carbon dioxide is sparingly soluble in styrenic polymer. In order to control the foaming of styrenic polymer by carbon dioxide, the extruder from which the foam issues is operated at a relatively low temperature. A plasticiser, usually an alcohol, is required to be added to the polymer in order to compensate for the increased viscosity exhibited at the low temperature otherwise the rate at which the foam can be produced has to be reduced. Although the resulting foam may have an initial thermal conductivity which is acceptable, over a short period of time the carbon dioxide diffuses from the foam thereby causing the thermal conductivity to rise. Carbon dioxide is significantly more soluble in acrylic polymer than in styrenic polymer. Thus, more carbon dioxide can be absorbed by the blend than by the styrenic polymer alone. The resulting combination of carbon dioxide and polymer blend can achieve a relatively low melt viscosity without the need for the addition of a plasticising agent. Generally, the acrylic polymer has a higher melt strength than that of the styrenic polymer. This allows the extruder to be operated at a higher temperature than with pure polystyrene before gas breakthrough occurs. The combination of desirable properties allows for improved rates of foam production and the production of a foam from which less carbon dioxide diffuses thereby maintaining a relatively low thermal conductivity for longer.

The quantity of the blowing agent used will depend, at least in part, on the composition of the polymer blend and the desired thermal conductivity of the foamed article. Typical levels range from 2 to 20 kg of blowing agent per 100 kg of polymer.

We claim:

1. A foamed article having a closed cell structure formed from
   (i) a polymer blend comprising at least 80% by weight of a styrenic polymer and up to 20% by weight of an acrylic polymer; and
   (ii) gaseous carbon dioxide blowing agent.

2. A foamed article as claimed in claim 1 wherein at least 50% of the monomer units of the styrenic polymer are derived from styrene.

3. A foamed article as claimed in claim 1 wherein the styrenic polymer is a homopolymer of styrene.

4. A foamed article as claimed in claim 3 wherein the styrenic polymer has an average molecular weight from 180000 to 250000.

5. A foamed article as claimed in claim 1 wherein the acrylic polymer contains from 50 to 100% by weight of monomer units which are derived from a methacrylate with the balance of the monomer units being derived from at least one acrylate.

6. A foamed article as claimed in claim 1 wherein the closed cells have sides in the range from 100 to 1000 $\mu$.

7. A foamed article as claimed in claim 1 having a thermal conductivity which is from 80 to 97% of that of a similarly foamed article formed from the styrenic polymer alone.

8. A foamed article as claimed in claim 1 wherein the internal gas pressure is from 25 to 75% of the internal gas pressure of a similarly foamed article formed from the styrenic polymer alone.

9. A laminate comprising a foamed article as defined in claim 1 supported on a support material selected from plasterboard, wood or an other plastics structure.

* * * * *